(12) United States Patent
Przytula et al.

(10) Patent No.: US 7,577,548 B1
(45) Date of Patent: Aug. 18, 2009

(54) INTEGRATED FRAMEWORK FOR DIAGNOSIS AND PROGNOSIS OF COMPONENTS

(75) Inventors: Krzysztof W Przytula, Malibu, CA (US); Shubha Kadambe, Thousand Oaks, CA (US); Narayan Srinivasa, Oak Park, CA (US)

(73) Assignee: HRL Laboratories, Malibu, CA (US)

( * ) Notice: Subject to any disclaimer, the term of this patent is extended or adjusted under 35 U.S.C. 154(b) by 133 days.

(21) Appl. No.: 11/713,561

(22) Filed: Mar. 1, 2007

Related U.S. Application Data

(60) Provisional application No. 60/778,642, filed on Mar. 4, 2006.

(51) Int. Cl.
*G06F 19/00* (2006.01)
*G06F 17/40* (2006.01)

(52) U.S. Cl. .................. 702/182; 340/500; 340/540; 340/679; 340/870.01; 340/870.07; 340/870.16; 702/33; 702/34; 702/186; 702/187; 702/188

(58) Field of Classification Search ............. 340/500, 340/540, 679, 680, 870.01, 870.07, 870.16; 702/33, 34, 127, 182, 183, 184, 185, 186, 702/187, 188, 189, 1

See application file for complete search history.

(56) References Cited

U.S. PATENT DOCUMENTS

| | | | | | |
|---|---|---|---|---|---|
| 2,883,255 | A | * | 4/1959 | Anderson | 346/34 |
| 3,257,652 | A | * | 6/1966 | Foster | 340/521 |
| 3,348,234 | A | * | 10/1967 | Foster | 347/231 |
| 3,362,217 | A | * | 1/1968 | Evans et al. | 73/112.01 |
| 4,215,412 | A | * | 7/1980 | Bernier et al. | 701/100 |
| 4,402,054 | A | * | 8/1983 | Osborne et al. | 702/185 |
| 5,009,833 | A | * | 4/1991 | Takeuchi et al. | 376/217 |
| 5,710,723 | A | * | 1/1998 | Hoth et al. | 702/181 |
| 5,852,793 | A | * | 12/1998 | Board et al. | 702/56 |
| 6,351,713 | B1 | * | 2/2002 | Board et al. | 702/42 |
| 6,735,549 | B2 | * | 5/2004 | Ridolfo | 702/181 |
| 6,980,381 | B2 | * | 12/2005 | Gray et al. | 360/31 |
| 7,158,958 | B2 | * | 1/2007 | Przytula et al. | 706/45 |
| 7,328,200 | B2 | * | 2/2008 | Przytula | 706/52 |
| 7,336,434 | B2 | * | 2/2008 | Lille et al. | 360/6 |
| 2002/0040278 | A1 | * | 4/2002 | Anuzis et al. | 702/56 |
| 2002/0053046 | A1 | * | 5/2002 | Gray et al. | 714/42 |
| 2003/0216888 | A1 | * | 11/2003 | Ridolfo | 702/181 |
| 2005/0091012 | A1 | * | 4/2005 | Przytula et al. | 703/2 |

(Continued)

OTHER PUBLICATIONS

Przytula et al: "Evaluation of Bayesian Networks under Diagnostics," Proceedings of the 2003 IEEE Aerospace Conference, 2003.*

(Continued)

*Primary Examiner*—Edward R Cosimano
(74) *Attorney, Agent, or Firm*—Tope-McKay

(57) ABSTRACT

Described is a system for diagnosis and prognosis of a component. The system is configured to receive a signal from a component. The signal is representative of a current health observation of the component. The system also computes a present likelihood of the component failure based on the signal. Additionally, the system computes a future likelihood of failure of the component for a given future mission. Through diagnosis, a user can determine the present health of the component, and based on the present health and future mission, determine whether or not the component will fail in the future mission.

31 Claims, 8 Drawing Sheets

U.S. PATENT DOCUMENTS

| | | | |
|---|---|---|---|
| 2005/0091177 A1* | 4/2005 | Przytula | 706/52 |
| 2005/0160324 A1* | 7/2005 | Przytula et al. | 714/43 |
| 2007/0014041 A1* | 1/2007 | Lille et al. | 360/6 |
| 2007/0233285 A1* | 10/2007 | Yamamoto | 700/28 |

OTHER PUBLICATIONS

Przytula et al: "Collaborative Development of Large Bayesian Networks," Proceedings of the 2006 AUTOTESTCON, 2006.*

S. Engel, et al., "Prognostics, real issues involved with predicting life remaining," Proc. IEEE Aerospace Conf. 2000.

G. Provan, "An open systems architecture for prognostic inference during condition-based monitoring," Aerospace Conference 2003.

C.S. Byington, et al., "Prognostic enhancements to gas turbine diagnostic systems," Proc. Of IEEE Aerospace Conference 2003.

T. Brotherton, et al., "eSTORM: Enhanced self tuning on-board real-time engine model," Aerospace Conference 2003.

S.W. Wegerich, "Nonparametric modeling of vibration signal features for equipment health monitoring."

* cited by examiner

INTEGRATED FRAMEWORK FOR DIAGNOSIS AND PROGNOSIS OF COMPONENTS

PRIORITY CLAIM

The present application is a non-provisional patent application, claiming the benefit of priority of expired U.S. Provisional Application No. 60/778,642, filed on Mar. 4, 2006, entitled, "Integrated Framework and Algorithms for Diagnosis and Prognosis."

FIELD OF INVENTION

The present invention relates to a diagnosis and prognosis system and, more particularly, to an integrated framework that uses Bayesian Network (BN) models and Bayesian reasoning to compute the probability of a component's failure given the component's usage and mission, its present health, and its health-trend information.

BACKGROUND OF INVENTION

When operating a system having multiple components, it is often desirable to have an awareness of the current state of the health of the system and its components. Such awareness is often obtained using diagnostic tools, where the diagnostic tools evaluate the system to identify faulty components. Although knowledge of faulty components assists a user in maintaining the system, it does not provide information about future performance of the system. Such projections are typically obtained using a prognostic tool.

In conventional software tools, diagnosis and prognosis are handled separately. Diagnosis tools use rules, case bases, or logic models to provide diagnostic recommendations. These approaches are not suitable for expressing uncertainty, which is inherent in prognosis. Current prognosis solutions are limited to individual components or simple subsystems (e.g., bearings, turbine disks, electric motors, and batteries). The reasoning in these systems is typically customized to the application and often based on simple heuristics.

For example, a paper entitled, "Prognostics, Real Issues Involved with Predicting Life Remaining," by S. Engel et. al, presented at the Proc. IEEE Aerospace Conf. 2000, describes in general terms the prognosis problem. The paper presents prognosis within a probabilistic framework and defines key issues involved in applying a probabilistic approach to prognosis. However the probabilistic approach is theoretical in nature and the paper does not provide specific solutions or algorithms. Additionally, the paper does not describe how to implement the probabilistic approach to a practical complex system. In particular, the paper does not present a way of integrating the diagnosis with prognosis. Although it mentions Bayesian Network (BN) as a possible avenue of implementation, it lacks discussion of a specific algorithm capable of computing probability of component failure given usage and mission, present health, and health-trend information.

Additionally, a paper entitled, "An Open Systems Architecture for Prognostic Inference during Condition-Based Monitoring," by G, Provan and presented at the Aerospace Conference 2003, describes an open systems architecture representation that is critical to a high-level analysis of prognosis. The paper specifies a generic prognosis module, the inputs and outputs to it, measures of remaining useful life and the importance of how a component will be used. However, the paper is very unclear about the details of its architecture and does not provide any insight into the exact nature of how the observations can be integrated into a prognostic framework.

There are several solutions that can be found in the literature that focus on applying the general framework for a particular application and on developing prognostic solutions for specific subsystems. By way of example, the first reference below belongs to the former category and the following two references belong to the latter category.

A paper entitled, "Prognostic Enhancements to Gas Turbine Diagnostic Systems," by C. S. Byington, M. Watson, M. J. Roemer, T. R. Galie and J. J. McGroarty, that was presented at the Proc. of IEEE Aerospace Conference 2003, describes the general framework for a specific application (gas turbine engine diagnosis). Although observations from sensors and historical data are used, the system described in this paper does not include physics models and mission requirements.

Another paper, entitled, "eSTORM: Enhanced Self Tuning On-board Real-Time Engine Model," by T. Brotherton, A. Volponi, R. Luppold & D. L. Simon, and published at the Aerospace Conference 2003, describes a method for on-line diagnostics and prognostics. The method improved upon a physics-based model called STORM, with an empirical neural network such that modeling errors during on-line functions are mitigated. The model described in this paper was developed for an aircraft engine, with results being specific to the aircraft engine. The paper focused on a narrow aspect of trending for a subsystem and did not address the crucial aspect of how various components for prognosis can be integrated into a single framework.

A paper entitled, "Nonparametric Modeling of Vibration Signal Features for Equipment Health Monitoring," by S. W. Wegerich, describes a method for modeling vibrations of systems from data. It also provided a method for evaluating if the vibrations are predictive of impending failures and provides an approach to compute "Useful Life Remaining" of equipment based on the residual errors computed from the vibration characteristics. The modeling described in the paper is very narrow as it applied to a specific component of a subsystem.

No system heretofore devised combines diagnostic tools with prognostic tools. Thus, a continuing need exists for a systematic solution, which combines diagnosis with prognosis and that is application independent and can be scaled to complex systems.

SUMMARY OF INVENTION

The present invention relates to a system for diagnosis and prognosis of a component. The system comprises a diagnosis module and a prognosis module. The diagnosis module is configured to receive a signal from a component and computer a present state of the component based on the signal. The signal is representative of a current state observation of the component. The prognosis module is configured to compute a likelihood of a future state of the component for a given future mission. Through diagnosis, a user can determine the present state of the component, and based on the present state and future mission, determine the likelihood of the future state in the future mission.

Although generally described as the present state, current state, and future state, the present invention can also be termed in relation to the health of the components. For example, the likelihood of a future state is a future likelihood of failure of the component for a given future mission. Additionally, the current state and present state are the current health and present health respectively. Thus, through diagnosis, a user can determine the present health of the component, and based on the present health and future mission, determine whether or not the component will fail in the future mission.

In another aspect, the diagnosis module and the prognosis module are collectively configured to perform operations of:
  computing present prior probabilities of component failure;
  computing present posterior probabilities of component failure given present health observations;
  computing prior probabilities of component failure at an end of the future mission; and
  computing future posterior probability of component failure at the end of future the mission, where the future posterior probability indicates the likelihood of failure for the component at the end of the future mission.

In yet another aspect, when computing present prior probabilities, the system is further configured to perform operations of:
  generating a failure histogram of component failures as a function of a component's usage variables, where each component has usage variables that are indicative of usage of the component, and the histogram having a past bin, a present bin, and a future bin;
  using the histogram, determining the prior probability of component failure for each component;
  identifying a present value of the usage variable from the failure histogram, the present value being the present bin; and
  updating the failure histogram for each component to reflect that the component did not fail until the present bin, with the probability of the present bin in the updated failure histogram being the present prior probability of component failure.

Additionally, when updating the failure histogram, the system is further configured to perform operations of:
  setting the values of probabilities for the past bins to zero; and
  normalizing the probabilities for the present and future bins so that their sum is equal to one, with the probability for the present bin being the present prior probability of component failure.

In yet another aspect, when updating the failure histogram, if a histogram is unknown for a component, the system sets the prior probabilities for that component to a failure rate across the components.

In another aspect, when computing the present posterior probabilities of component failure, the system is further configured to perform operations of:
  setting the prior probabilities of the components to probability values computed above;
  determining the failure state of present-health observations by applying an observation algorithm to an observation selected from a group consisting of sensor outputs, manual measurements, and component symptoms; and
  computing posterior probability of failure of the components given prior probabilities and observations, where the posterior probability of failure indicates which components have likely already failed.

Furthermore, when computing the posterior probability of failure, the posterior probability of failure is computed using a Bayesian Network inference algorithm.

In yet another aspect, when computing prior probabilities of component failure at the end of the future mission, the system is further configured to perform operations of:
  renormalizing the failure histograms for each component by replacing the prior probability of failure for the present bin with the posterior probability of failure and updating the probability values for the future bins so that a sum of the probabilities for the present bin and future bins remains equal to a predetermined value, thereby creating a discrete density function;
  computing a distribution function from the discrete density function, with each bin of the distribution function being a sum of preceding bins in the renormalized failure histogram; and
  determining a bin that corresponds to an end of the future mission, where the value in the bin that corresponds to the end of the future mission is the prior probability of component failure at the end of the future mission.

In another aspect, when computing future posterior probability of component failures at the end of the future mission, the system is further configured to perform operations of:
  setting the prior probabilities of the components to values computed above;
  setting health-trend observations as values obtained from a trending algorithm; and
  computing the future posterior probabilities of component failure using a Bayesian Network inference algorithm, where the future posterior probability indicates the likelihood of failure for a particular component at the end of the future mission.

Finally, as can be appreciated by one skilled in the art, the present invention also includes a method and computer program product to perform the acts and operations described herein. Thus, the computer program product comprises computer-readable instruction means encoded on a computer-readable medium that are executable by a computer for causing the computer to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
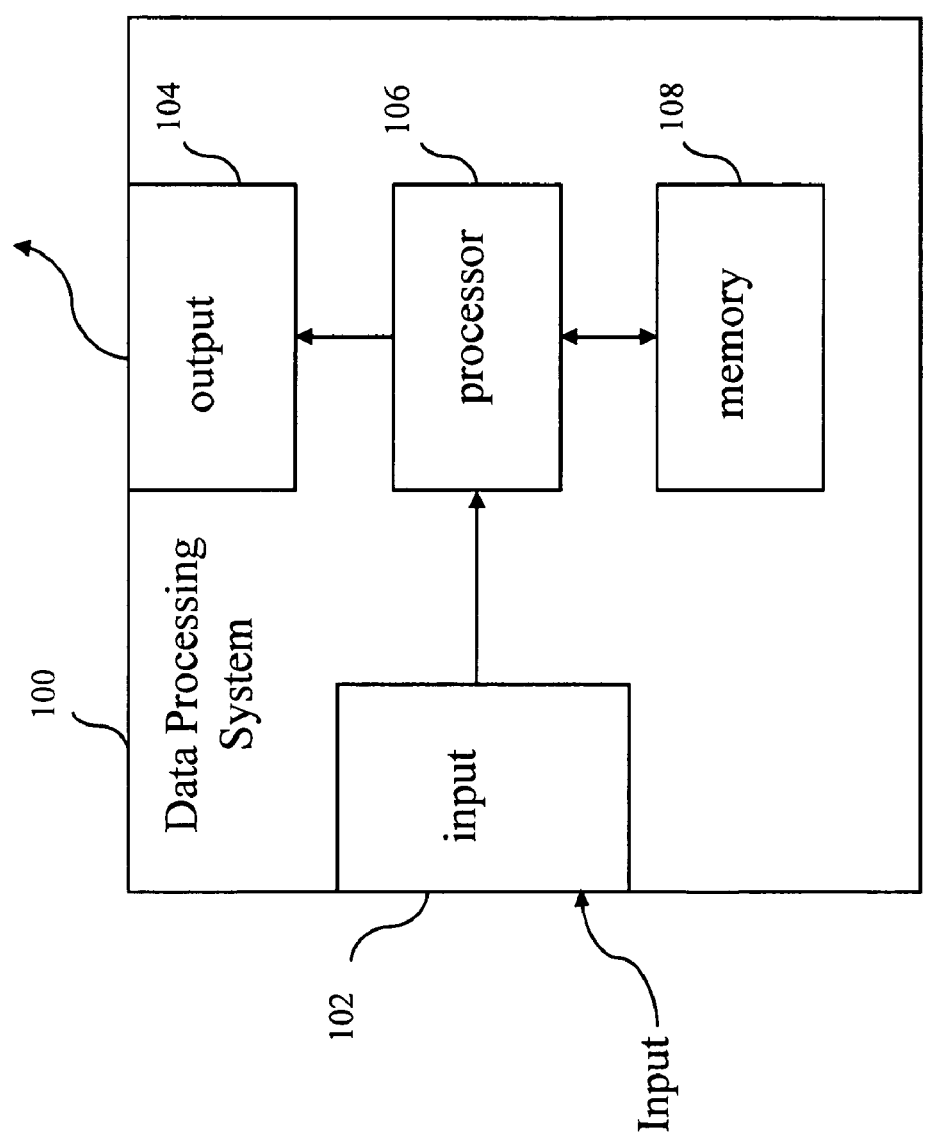
FIG. 1 is a block diagram depicting components of a diagnosis and prognosis system according to the present invention.

The present invention relates to a diagnosis and prognosis system and, more particularly, to an integrated framework that uses Bayesian Network (BN) models and Bayesian reasoning to compute the probability of a component's failure given the component's usage and mission, its present health, and its health-trend information. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction is provided to provide the reader with a general understanding of the present invention. Finally, a description of various aspects of the present invention is provided to give an understanding of the specific details.

(1) GLOSSARY

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Component—The term "component" as used with respect to the present invention generally refers to system or subsystem that is operable in performing a future mission and which is subject to usage in performing the future mission.

Future Mission—The term "future mission" as used with respect to the present invention generally refers to predetermined task that is performed using the component. The future mission can be defined in terms of future usage of the component in completing the future mission, as applied to the usage variable.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Usage—The term "usage" refers to the amount of usage of a component. The amount of usage of a component can be measured in multiple variables, non-limiting examples of which include time, repetitions, cycles, distance, etc.

Usage Variable—The term "usage variable" refers to a variable that is indicative of usage of a component. The observation of usage for a given component is a value of its usage variable(s). Usage variable of a given component is a variable best representing the component use (e.g., for a tire it may be miles, for an engine hours of operation and for a valve number of cycles of operation).

(2) PRINCIPAL ASPECTS

The present invention has three "principal" aspects. The first is a diagnosis and prognosis system. The diagnosis and prognosis system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a diagnosis and prognosis system of the present invention is provided in FIG. 1. The diagnosis and prognosis system 100 comprises an input 102 for receiving information from at least one sensor for use in detecting a state and trend of a system. Note that the input 102 may include multiple "ports." Typically, input is received from at least one sensor. An output 104 is connected with the processor for providing diagnostic and prognostic information to other systems in order that a network of computer systems may serve as a diagnosis and prognosis system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
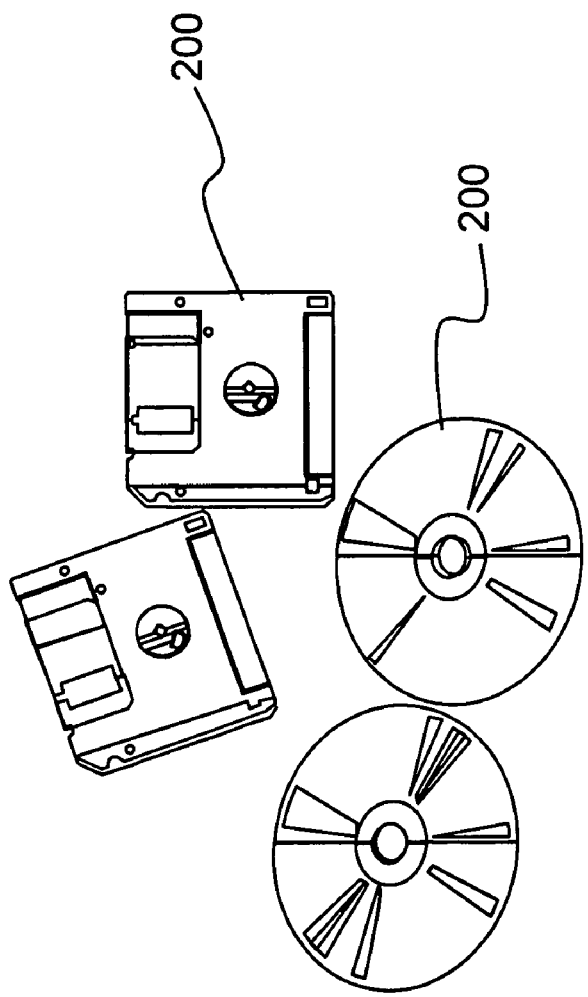
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) INTRODUCTION

The present invention includes an integrated framework and algorithm for diagnosis and prognosis. The framework is based on Bayesian Network (BN) models and Bayesian reasoning. Diagnosis and prognosis are integrated using a single model and reasoner. Moreover, the framework combines evidence about the present health of the system, health trend, as well as system usage and mission severity. The algorithms for reasoning on the combined evidence are novel. The present invention also includes a methodology for design of prognostic observations and design of the BN model. The methodology and algorithms are suitable for complex systems.

The possible complex systems include manufacturing systems, automobiles, airplanes, defense systems, space vehicles, launch vehicles, etc.

(4) DESCRIPTION

The present invention will be described in three sections. First, the overall framework of the solution for diagnosis and prognosis will be described. Second, the methodology of applying the framework in practice using a simple example is descried. Third, the algorithm for reasoning that is used in the framework is presented.

(4.1) Framework for Diagnosis and Prognosis

Figure 3:
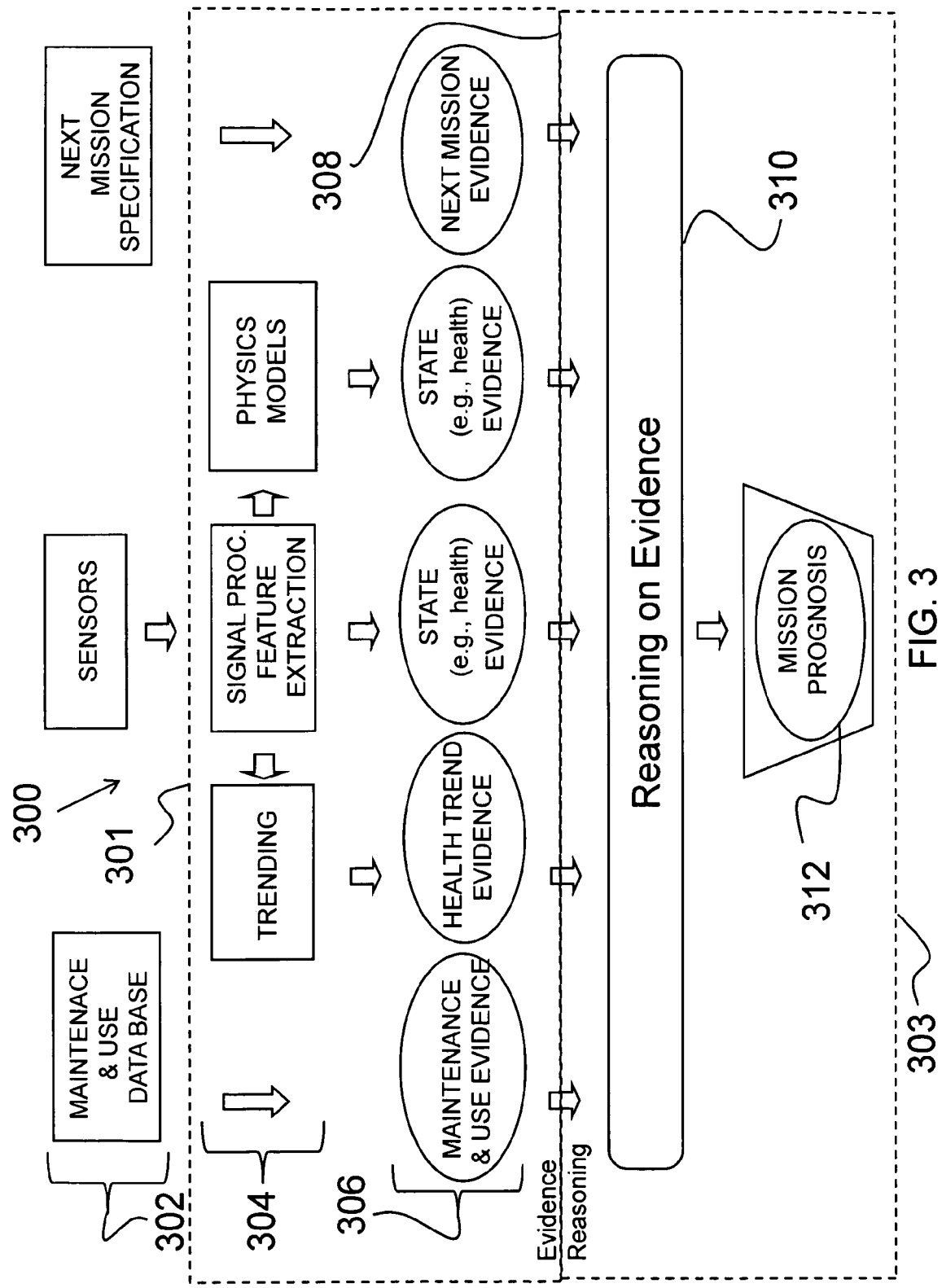
FIG. 3 is a flow chart illustrating a framework for diagnosis and prognosis according to the present invention.

In the framework for diagnosis and prognosis, there are three sources of evidence (i.e., the usage and maintenance database, next mission specification, and the diagnosed system itself). The usage and maintenance database provides evidence about the degree of past use for each of the system components, which is to be covered by the prognosis. The specification for next mission comes from the user of the prognosis recommendations. The mission specification indicates how much future use is expected of the system components during the mission. Finally, the measurements and observations performed on the system with the help of built-in sensors, external test devices, etc., provide the evidence about the present health of the system and its health history. FIG. 3. includes a flow chart illustrating the framework 300 for Diagnosis and Prognosis. As shown, the framework 300 includes a diagnosis module 301 and a prognosis module 303. The rectangles represent evidence 302 sources and processing steps 304. The ovals represent observations 306 derived from the evidence. The steps below the dotted line 308 are completed by the prognosis module 303 and include the reasoning step 310 and the result 312 (i.e., Mission Prognosis).

The different forms of evidence 302 undergo processing 304 to derive observations 306 of diagnostic/prognostic value. The observation of usage for a given component is a value of its usage variable(s). Usage variable of a given component is a variable best representing the component use (e.g., for a tire it may be miles; for an engine hours of operation; and for a valve number of cycles of operation). There may be more than one usage variable for a given component. The variable(s) must be recorded so that it is known what its present value is. The observation based on next mission specification for the component is a delta of its usage variable(s). The present-state (e.g., present-health) observations are obtained from a sensor or detector by means of signal processing and feature extraction. In some cases feature extraction could be implemented using physics models. The future-state (e.g., future-health) observations are computed from the history of state (e.g., health) observation values by means of trending.

The reasoning in the framework is based on models. The system 100 and the diagnostic/prognostic observations 306 are modeled using graphical probabilistic models, such as Bayesian Networks (BN). The model includes components and subsystems for which it is desirable to produce diagnostic/prognostic recommendations and all the observations that are available for the components. When the results of observation are known, the observation nodes in the model are set to the appropriate states and probabilistic inference is performed on the model to obtain the prognosis result in the form of a likelihood of a future state, such as the probability of failure of components and subsystems. As another non-limiting example, the likelihood of the future state could be the probability of success of components and subsystems.

(4.2.) Methodology of Applying the Framework to a Specific System

To apply the framework to a specific system, a BN model is created of its components, subsystems and their diagnostic/prognostic observations. Algorithms are also defined, which produce the observations from the raw data about the usage, mission and health of the system. This is best done with help of software tools. A number of software tools to assist in the process of development of the BN model and the observation algorithms have been developed by the inventors of the present invention. They are not subject of the present invention, however they are incorporated herein by reference as though fully set forth herein. Such tools include a Bayesian model editor and a Bayesian model evaluation tool, and were described by K. W. Przytula, D. Dash, and D. Thompson, in "Evaluation of Bayesian Networks under Diagnostics," Proceedings of the 2003 IEEE Aerospace Conference, 2003, and by K. W. Przytula, G. Isdale, and T. C. Lu, in "Collaborative Development of Large Bayesian Networks," Proceedings of the 2006 AUTOTESTCON, 2006.

Figure 4:
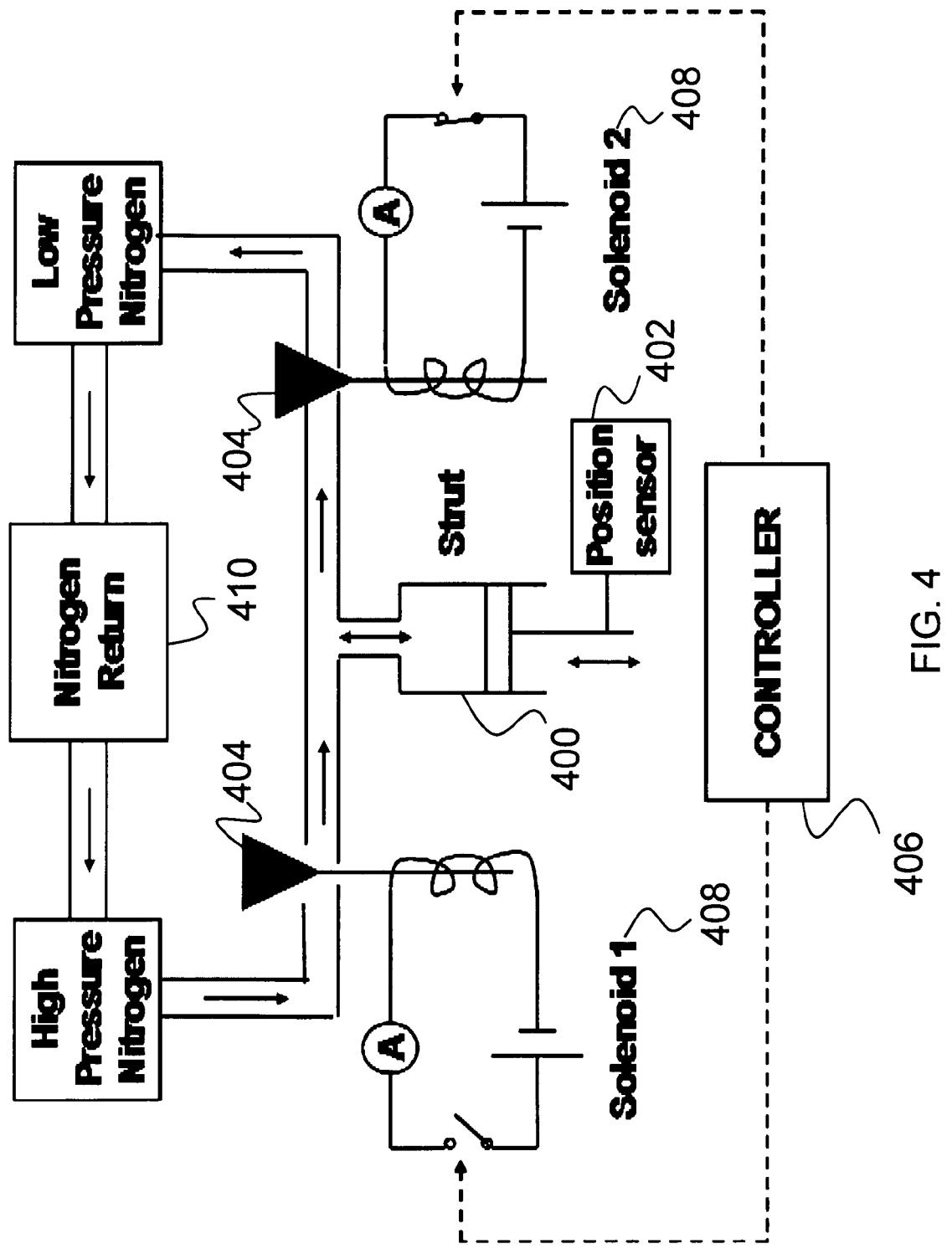
FIG. 4 is a schematic of a system (simple variable suspension system) upon which the diagnosis and prognosis system of the present invention can be employed.

The acts involved in the development of a diagnostic/prognostic solution according to the framework are illustrated in FIG. 4, using a simple variable suspension system as an example. As shown in FIG. 4, the exemplary system consists of a strut 400 with a position sensor 402, two valves 404 controlling the flow of nitrogen into the strut 400 and out of it, a controller 406 (which turns on and off the current in the solenoid circuits 408 of the valves 404), and a nitrogen recirculation system 410. For purposes of illustration, attention is focused only on the valves 404 and the observations pertaining to their usage, mission, and health. The valves 404 constitute a simple two-valve subsystem. As can be appreciated by one skilled in the art, the exemplary system described below is for illustrative purposes only, as the present invention can be used on a wide array of complex systems. Non-limiting examples of such systems include entire automobiles and their components and subsystems, and people and their various systems and organs.

(4.2.1) Define Usage and Mission Observations

For illustrative purposes, it is assumed that the valve controller 406 counts the on/off cycles of the valves 404 and the cycle count is used as the usage variable. The mission will be defined for the valves 404 in terms of the cycles as well.

(4.2.1) Define Present Health Observations and Algorithms for their Derivation from Available Signals The strut position sensor 402 provides a signal. This signal is used as a basis of one common health observation for both valves 404, because the strut 400 operation depends on both of them. The state of health of the valves 404 can be characterized by the rate of change of the strut 400 position. For example, the slower the rate of change of the strut's 400 position is indicative of valves 404 that are more worn than valves 404 having a strut 400 with a faster rate of change. The rate may be affected by the strut 400 itself. However, for simplicity, the strut 400 will be excluded from consideration. The position signal should undergo low pass filtering before the rate of change is derived from it to remove the noise effect of the sensor 402. The position rate of change will become a common health observation for the two valves 404.

For each of the valves 404, the current is measured in the solenoid circuit 408 as a function of time. The valve 404 response time can be obtained from the current. The response time can be calculated with the help of a physics model of the solenoid circuit 408 with current as its input. The response times provide two more health observations, one for each valve 404. As can be appreciated by one skilled in the art, the selection of an appropriate physics model is not a subject of this invention.

(4.2.3) Define Future Health Observation and Algorithm for Trending

The position rate of change can be used for future health observations. A history of position rate for some number of recent valve 404 cycles is taken and trended into the future up to the number of cycles that represents the end of the mission. As can be appreciated by one skilled in the art, an appropriate trending algorithm is selected given the characteristic of the position rate history and the mission. The position rate at the end of the mission constitutes the future-health observation. The selection of an appropriate trending algorithm is not a subject of this invention.

(4.2.4) Develop BN Model for the Sub System.

Figure 5:
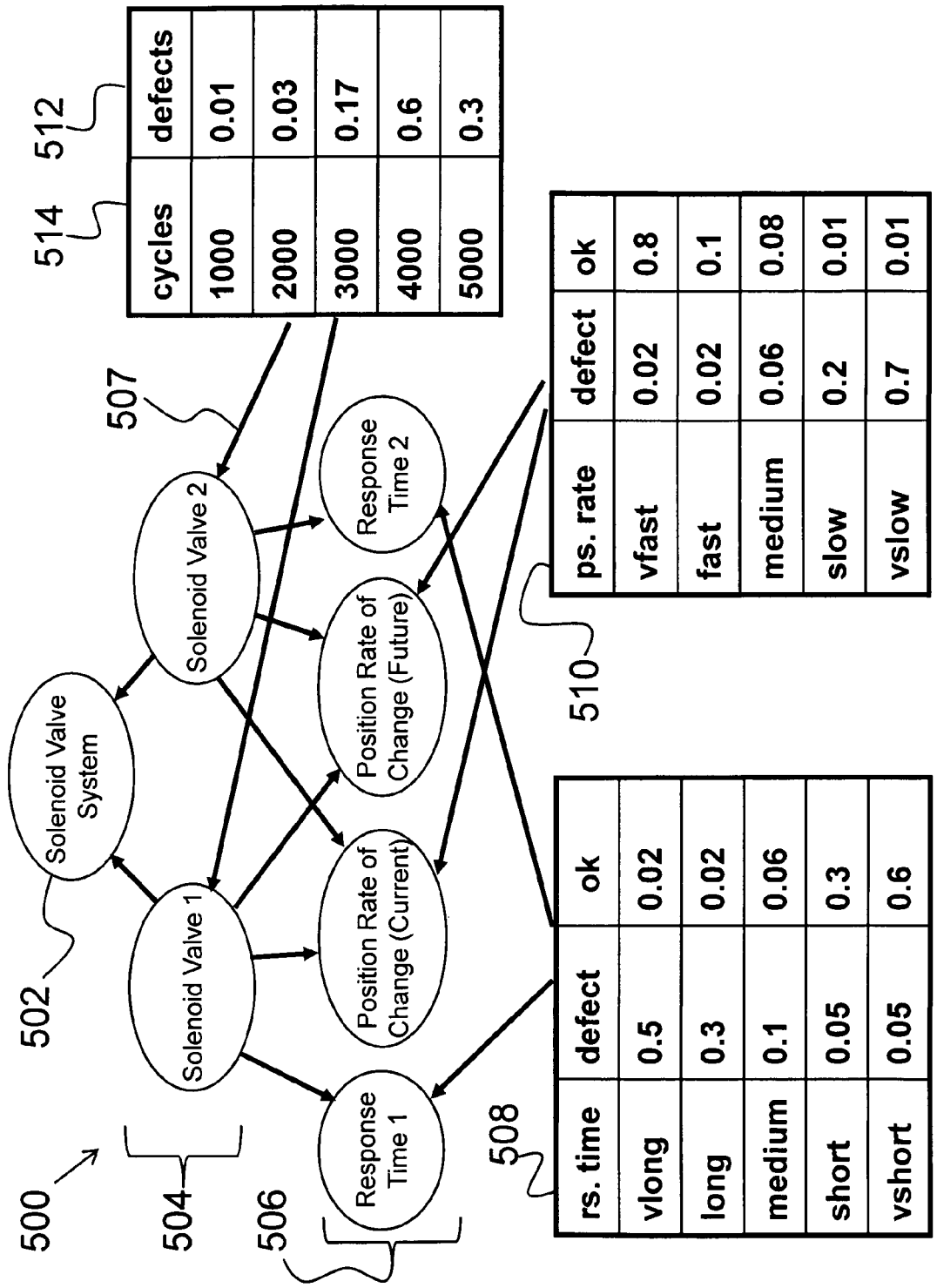
FIG. 5 is an illustration of a Bayesian Network (BN) model for various structural components and parameters of the suspension system illustrated in FIG. 4.

As shown in FIG. 5, the diagnostic/prognostic BN model 500 covers the valve sub system 502, the two valves 504 and the four health observations 506. As shown, the valves 504 and the observations 506 are represented as nodes. The directed arcs 507 indicate causal dependencies. The valve 504 defects cause the sub system 502 to fail and the health observations 506 to occur. For simplicity, the valves 504 and the valve sub system 502 have only a single failure mode (i.e., "defect") and an OK mode. The health observations each have for simplicity only five states. For the response time observation 508, the states are: very long, long, medium, short, very short. For the position rate 510 and position rate trend, the states are: very slow, slow, medium, fast, very fast.

The BN structure is annotated with parameters. The valve nodes require prior probability of valve failure given usage states and the observations require conditional probabilities of their states given the states of the valves. FIG. 5 shows examples of the parameters (i.e., prior and conditional probability distributions in the form of tables).

The prior probability table for the valve nodes is created using a distribution of valve failures. The distribution is a normalized histogram of valve failures 512 as a function of cycles 514. The histogram can be generated from field failure data or from a simulation. Details of how to simulate the system to produce the histogram is available in the literature. Although described as a histogram, any suitable chart (or categorizing and/or graphing method) can be used to accomplish the same result. As can be appreciated by one skilled in the art, the histogram is described herein as having bins to catalog (categorize) data, however, other suitable techniques such as tables and graphs can be used interchangeably herewith. Thus, although the claims describe a histogram having bins, they are not intended to be limited thereto as other equivalent techniques can be used interchangeably therein.

Figure 6:
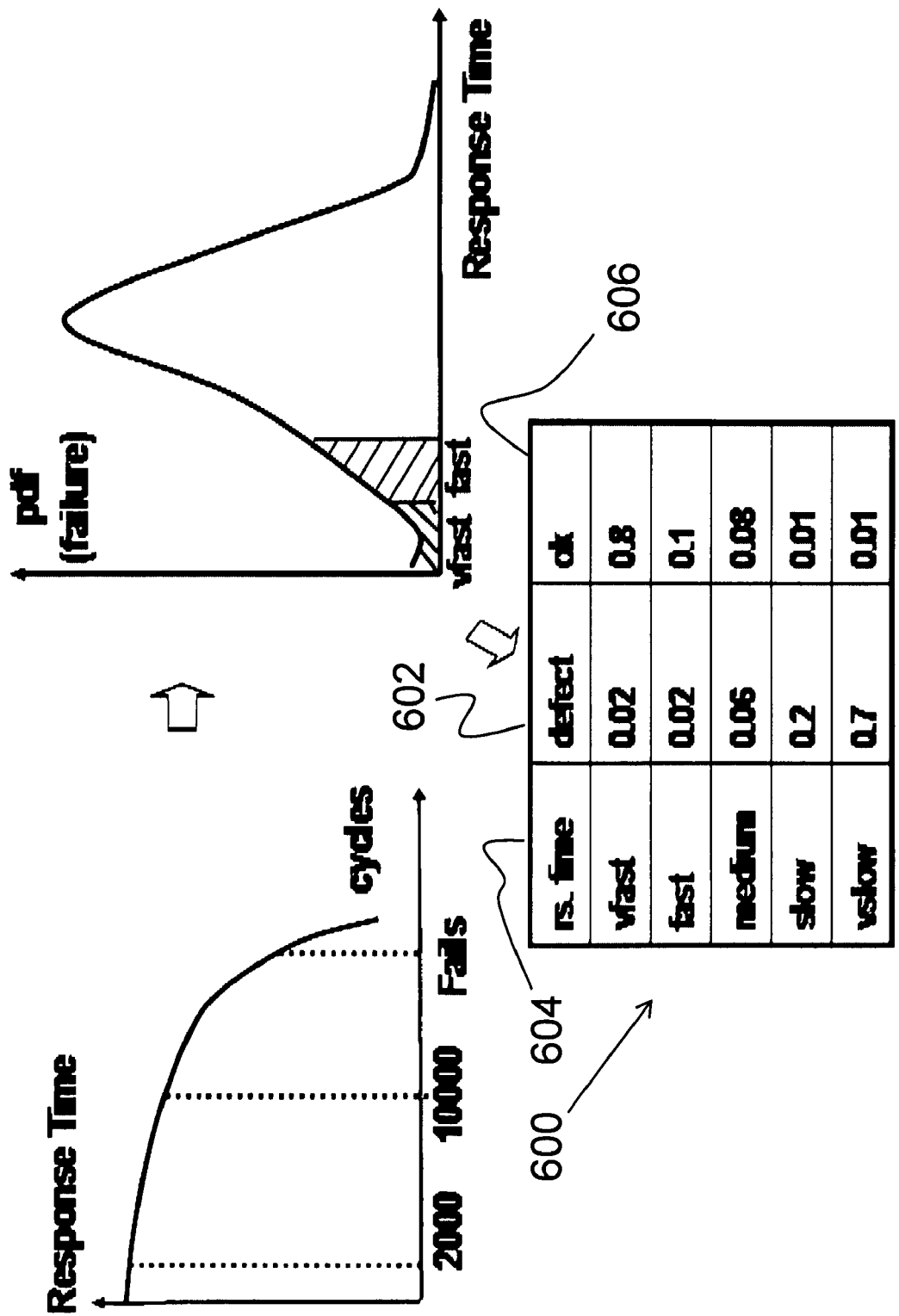
FIG. 6 is a graphical illustration of the derivation of a conditional probability table from the feature as a function of the usage variable.

To model health observations, "noisy" nodes are used. Non-limiting examples of such "noisy" nodes include Noisy Or, Noisy Max and Noisy Adder. As can be appreciated by one skilled in the art, Noisy Or, Noisy Max, and Noisy Adder are described in the literature on BN. The conditional probability tables for "noisy" observation nodes have a separate column for failure modes of each parent node (i.e., each component observed by the node). As shown in FIG. 6, the column is again a normalized histogram 600 of the valve failures 602. However, here the histogram 600 is not a function of cycles but of the states of the pertinent observation variable 604 (i.e., response time or rate of position change, as shown in FIG. 6). The last column of the table contains so called "leak" 606. It is a histogram 600 of instances of both valves operating properly as a function of the observation variable 604. The histograms needed for the conditional probability tables can be obtained from the field data or from simulation.

Figure 7:
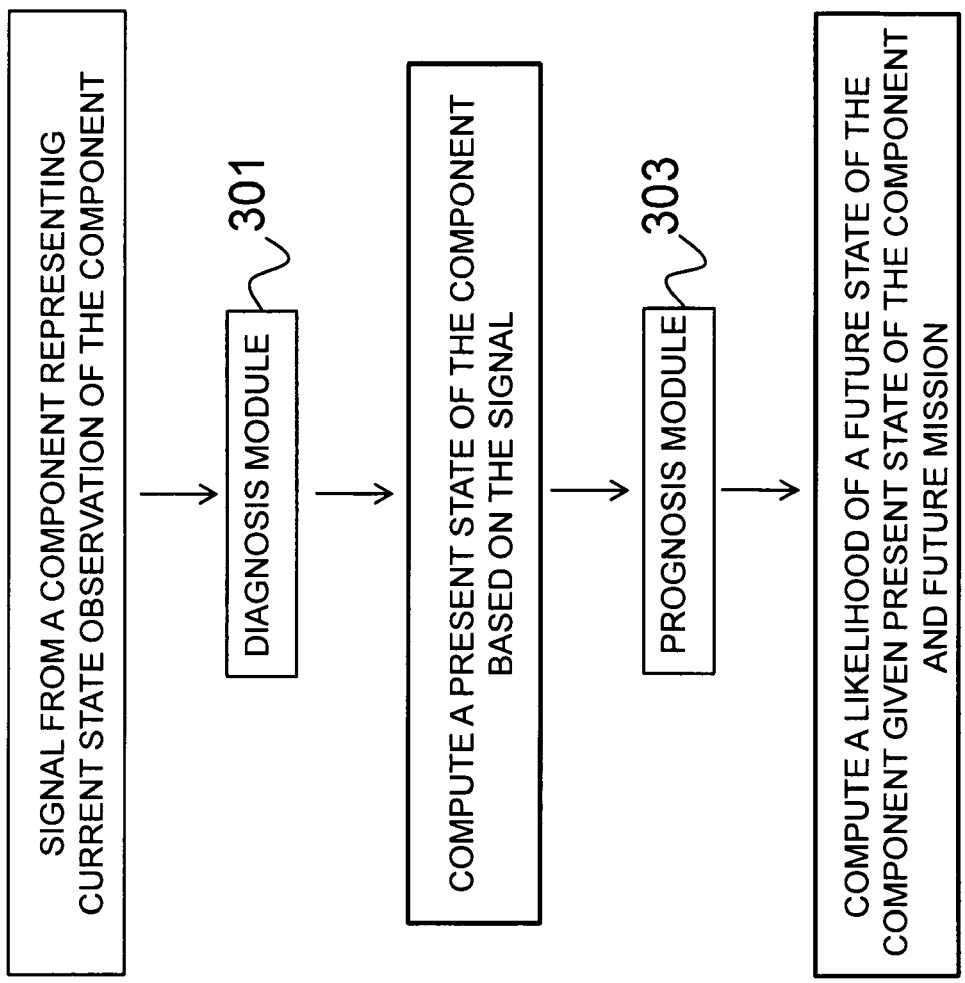
FIG. 7 is a flow chart illustrating acts of a system for diagnosis and prognosis of a component according to the present invention.
Figure 8:
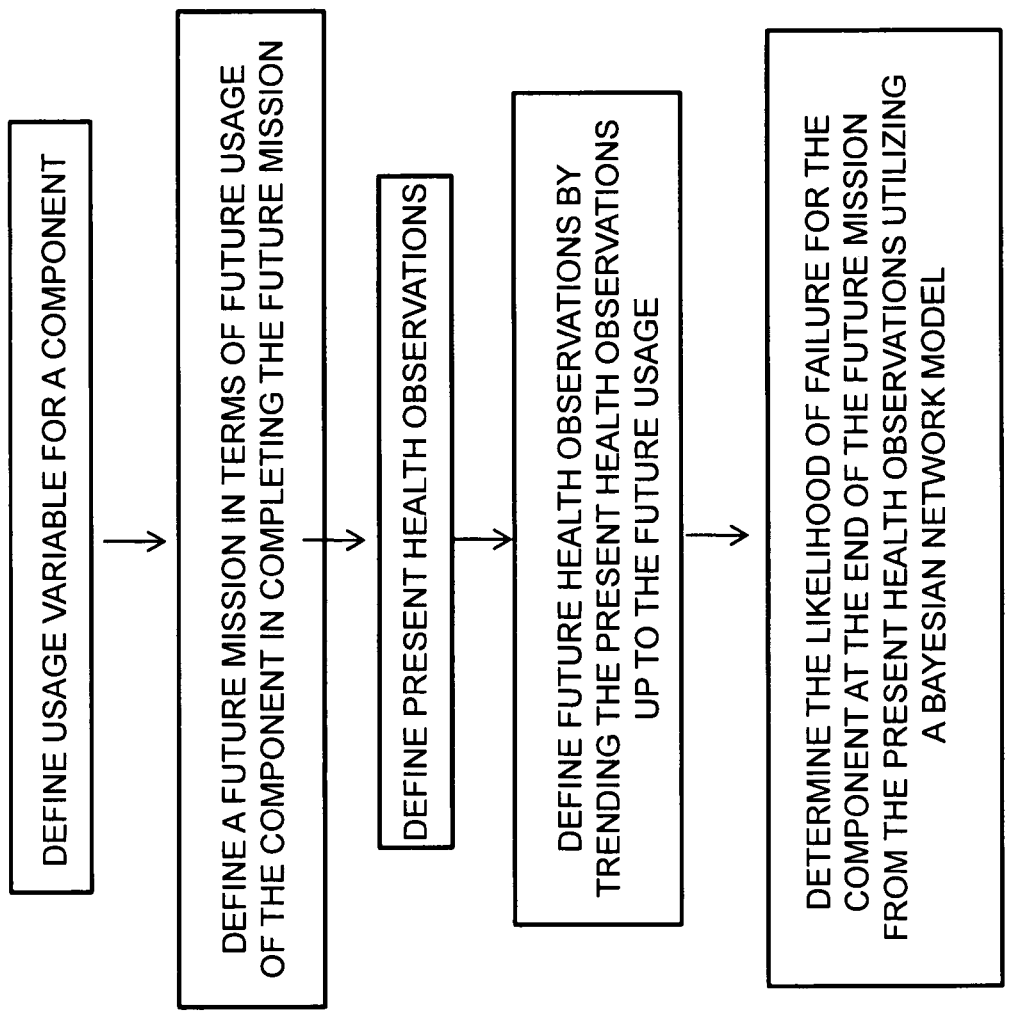
FIG. 8 is a flow chart illustrating a method for diagnosis and prognosis of a component according to the present invention.

FIG. 7 depicts a flow chart illustrating a system for diagnosis and prognosis of a component including acts performed by the diagnosis module 301 and the prognosis module 303. A flow chart illustrating a method for diagnosis and prognosis of a component according to the present invention is depicted in FIG. 8.

(4.3) Reasoning Algorithm for the Framework

The prognosis recommendation is a list of components and sub systems with their probability of failure at the end of the mission given the present usage and the health of the system. The probability is computed using the BN model of the system and reasoning algorithms. Following are the acts involved in the computations.

(4.3.1) Compute Present Prior Probabilities of Component Failures.

The prior probability of a failure state is determined for each failure state of each component. The value is obtained from the histogram of the component failures as a function of its usage variable(s). In the case of valves, cycles are used as the single usage variable. The present value of the usage variable is identified (i.e., the present histogram bin, from the information in the usage database). The original failure histogram is updated for the component using the knowledge that the component did not fail until the present bin. This act amounts to renormalization of the histogram. The values of probabilities for the bins preceding the present bin are set to zero, whereas the probabilities for the present and future bins are renormalized, so that their sum is equal to a predetermined value, such as one. The same procedure can be used for components characterized by multiple usage variables (i.e., for multidimensional histograms). The updated probability for the present bin becomes the present prior probability for the failure state of the component. For the components for which the histograms are unknown, the prior probabilities are set to a failure rate (e.g., average failure rate) across the components (e.g., fleet).

(4.3.2) Compute Present Posterior Probability of Component Failures Given Present Health Observations This is effectively a diagnosis step. The prior probabilities of the components are set to the values computed above in section 4.3.1. The states of present-health observations are determined by applying observation algorithms to sensor outputs, manual measurements, or symptoms. The unobserved nodes are set to an "unknown" state. Then, the posterior probability of failure of the system components is computed given priors and observations. The probabilities of component failure indicate which components may have already failed. For this, BN inference algorithms can be used.

These algorithms are available in the form of commercially available engines and research engines. Non-limiting examples of commercially available engines include Hugin and Netica. Hugin is produced by Hugin Expert, located at Gasvaerksvej 5, 9000 Aalborg, Denmark. Netica is produced by Norsys Software Corp, located at 3512 West 23rd Avenue, Vancouver, British Columbia, Canada, V6S 1K5. Non-limiting examples of research engines include GeNIe, produced by researchers at the University of Pittsburgh, located at Pittsburgh, Pa., 15260, and SamIam, produced by researchers at the University of California, Los Angeles, located at Los Angeles, Calif., 90095.

(4.3.3) Compute Prior Probabilities of Component Failures at the End of the Mission This act is similar to procedure described above in section 4.3.1. First, the histograms of component failures are renormalized for each component. The prior probability of failure for the present bin is replaced by the posterior probability computed above in section 4.3.2. Additionally, the probability values for future bins are updated so that the sum of probabilities remains equal to one. From the renormalized histogram, which is a discrete density function, a distribution function can be computed. Each bin of the distribution function is a sum of preceding bins of the histogram. The new distribution function will be used to obtain prior probability of failure for the end of the mission. The bin of the end of the mission is determined from the present usage and mission specifications, which indicate, for example, how many additional cycles are required for the mission. The prior probability at the end of the mission is the value looked up from the distribution function for the bin.

(4.3.4) Compute Future Posterior Probability of Component Failures at the End of the Mission This act is similar to the procedure described above in section 4.3.2. It is effectively a prognosis step. The prior probabilities of components are set to values computed above in section 4.3.3. The states of present-health observations are set to "unknown," as they have already been accounted for in the priors. The states of health-trend observations are set to values obtained from the trending algorithms. As can be appreciated by one skilled in the art, the suitable trending algorithms are widely described in the literature.

Then, the posterior probabilities of component failures are computed using inference algorithms as described above in section 4.3.2. The probabilities indicate which components may fail at the end of the mission.

What is claimed is:

1. A system for diagnosis and prognosis of a component, comprising:
    a diagnosis module, the diagnosis module being configured to:
        receive a signal from a component, the signal being representative of a current state observation of the component;
        compute a present state of the component based on the signal; and
    a prognosis module, the prognosis module being configured to compute a likelihood of a future state of the component for a given future mission, whereby through diagnosis, a user can determine the present state of the component, and based on the present state and future mission, determine the likelihood of the future state in the future mission.

2. A system for diagnosis and prognosis as set forth in claim 1, wherein the likelihood of a future state is a future likelihood of failure of the component for a given future mission, and wherein the current state and present state are the current health and present health respectively, whereby through diagnosis, a user can determine the present health of the component, and based on the present health and future mission, determine whether the component will fail in the future mission.

3. A system for diagnosis and prognosis as set forth in claim 2, wherein the diagnosis module and the prognosis module are collectively configured to perform operations of:
    computing present prior probabilities of component failure;
    computing present posterior probabilities of component failure given present health observations;
    computing prior probabilities of component failure at an end of the future mission; and
    computing future posterior probability of component failure at the end of future the mission, where the future posterior probability indicates the likelihood of failure for the component at the end of the future mission.

4. A system as set forth in claim 3, wherein when computing present prior probabilities, the system is further configured to perform operations of:
    generating a failure histogram of component failures as a function of a component's usage variables, where each component has usage variables that are indicative of usage of the component, and the histogram having a past bin, a present bin, and a future bin;
    using the histogram, determining the prior probability of component failure for each component;
    identifying a present value of the usage variable from the failure histogram, the present value being the present bin; and
    updating the failure histogram for each component to reflect that the component did not fail until the present bin, with the probability of the present bin in the updated failure histogram being the present prior probability of component failure.

5. A system as set forth in claim 4, wherein when updating the failure histogram, the system is further configured to perform operations of:
    setting the values of probabilities for the past bins to zero; and
    normalizing the probabilities for the present and future bins so that their sum is equal to one, with the probability for the present bin being the present prior probability of component failure.

6. A system as set forth in claim 5, wherein when updating the failure histogram, if a histogram is unknown for a component, setting the prior probabilities for that component to a failure rate across the components.

7. A system as set forth in claim 6, wherein when computing the present posterior probabilities of component failure, the system is further configured to perform operations of:
    setting the prior probabilities of the components to probability values computed in claim 5;
    determining the failure state of present-health observations by applying an observation algorithm to an observation selected from a group consisting of sensor outputs, manual measurements, and component symptoms; and
    computing posterior probability of failure of the components given prior probabilities and observations, where the posterior probability of failure indicates which components have likely already failed.

8. A system as set forth in claim 7, wherein when computing the posterior probability of failure, the posterior probability of failure is computed using a Bayesian Network inference algorithm.

9. A system as set forth in claim 8, wherein when computing prior probabilities of component failure at the end of the future mission, the system is further configured to perform operations of:
    renormalizing the failure histograms for each component by replacing the prior probability of failure for the present bin with the posterior probability of failure and updating the probability values for the future bins so that a sum of the probabilities for the present bin and future bins remains equal to a predetermined value, thereby creating a discrete density function;

computing a distribution function from the discrete density function, with each bin of the distribution function being a sum of preceding bins in the renormalized failure histogram; and determining a bin that corresponds to an end of the future mission, where the value in the bin that corresponds to the end of the future mission is the prior probability of component failure at the end of the future mission.

10. A system as set forth in claim 9, wherein when computing future posterior probability of component failures at the end of the future mission, the system is further configured to perform operations of:

setting the prior probabilities of the components to values computed in claim 9;

setting health-trend observations as values obtained from a trending algorithm; and computing the future posterior probabilities of component failure using a Bayesian Network inference algorithm, where the future posterior probability indicates the likelihood of failure for a particular component at the end of the future mission.

11. A method for diagnosis and prognosis of a component, comprising acts of:

defining a usage variable for a component, the usage variable being a variable that is indicative of usage of the component;

defining a future mission in terms of future usage of the component in completing the future mission, as applied to the usage variable;

defining present health observations, the present health observations being indicative of a present health state of the component;

defining future health observations by trending the present health observations up to the future usage; and utilizing a Bayesian Network model to determine the likelihood of failure for the component at the end of the future mission from the present health observations and the future health observations.

12. A method for diagnosis and prognosis of a component, comprising acts of:

receiving a signal from a component, the signal being representative of a current state observation of the component;

computing a present state of the component based on the signal; and computing a likelihood of a future state of the component for a given future mission, whereby through diagnosis, a user can determine the present state of the component, and based on the present state and future mission, determine the likelihood of the future state in the future mission.

13. A method for diagnosis and prognosis as set forth in claim 12, wherein in the acts of receiving a signal, computing a present state, and computing a likelihood of a future state, the likelihood of a future state is a future likelihood of failure of the component for a given future mission, and wherein the current state and present state are the current health and present health respectively, whereby through diagnosis, a user can determine the present health of the component, and based on the present health and future mission, determine whether the component will fail in the future mission.

14. A method for diagnosis and prognosis as set forth in claim 13, further comprising acts of:

computing present prior probabilities of component failure;

computing present posterior probabilities of component failure given present health observations;

computing prior probabilities of component failure at an end of the future mission; and computing future posterior probability of component failure at the end of future the mission, where the future posterior probability indicates the likelihood of failure for the component at the end of the future mission.

15. A method as set forth in claim 14, wherein the act of computing present prior probabilities further comprises acts of:

generating a failure histogram of component failures as a function of a component's usage variables, where each component has usage variables that are indicative of usage of the component, and the histogram having a past bin, a present bin, and a future bin;

using the histogram, determining the prior probability of component failure for each component;

identifying a present value of the usage variable from the failure histogram, the present value being the present bin; and updating the failure histogram for each component to reflect that the component did not fail until the present bin, with the probability of the present bin in the updated failure histogram being the present prior probability of component failure.

16. A method as set forth in claim 15, wherein the act of updating the failure histogram further comprises acts of:

setting the values of probabilities for the past bins to zero; and normalizing the probabilities for the present and future bins so that their sum is equal to one, with the probability for the present bin being the present prior probability of component failure.

17. A method as set forth in claim 16, wherein in the act of updating the failure histogram, if a histogram is unknown for a component, setting the prior probabilities for that component to a failure rate across the components.

18. A method as set forth in claim 17, wherein the act of computing the present posterior probabilities of component failure further comprises acts of:

setting the prior probabilities of the components to probability values computed in claim 16;

determining the failure state of present-health observations by applying an observation algorithm to an observation selected from a group consisting of sensor outputs, manual measurements, and component symptoms; and computing posterior probability of failure of the components given prior probabilities and observations, where the posterior probability of failure indicates which components have likely already failed.

19. A method as set forth in claim 18, wherein in the act of computing the posterior probability of failure, the posterior probability of failure is computed using a Bayesian Network inference algorithm.

20. A method as set forth in claim 19, wherein the act of computing prior probabilities of component failure at the end of the future mission further comprises acts of:

renormalizing the failure histograms for each component by replacing the prior probability of failure for the present bin with the posterior probability of failure and updating the probability values for the future bins so that a sum of the probabilities for the present bin and future bins remains equal to a predetermined value, thereby creating a discrete density function;

computing a distribution function from the discrete density function, with each bin of the distribution function being a sum of preceding bins in the renormalized failure histogram; and determining a bin that corresponds to an end of the future mission, where the value in the bin that corresponds to the end of the future mission is the prior probability of component failure at the end of the future mission.

21. A method as set forth in claim 20, wherein that act of computing future posterior probability of component failures at the end of the future mission further comprises acts of:

setting the prior probabilities of the components to values computed in claim 20;

setting health-trend observations as values obtained from a trending algorithm; and computing the future posterior probabilities of component failure using a Bayesian Network inference algorithm, where the future posterior probability indicates the likelihood of failure for a particular component at the end of the future mission.

22. A computer program product for diagnosis and prognosis, the computer program product comprising computer-readable instruction means encoded on a computer-readable medium that are executable by a computer for causing the computer to:

receive a signal from a component, the signal being representative of a current state observation of the component;

compute a present state of the component based on the signal; and compute a likelihood of a future state of the component for a given future mission, whereby through diagnosis, a user can determine the present state of the component, and based on the present state and future mission, determine the likelihood of the future state in the future mission.

23. A computer program product for diagnosis and prognosis as set forth in claim 22, wherein the likelihood of a future state is a future likelihood of failure of the component for a given future mission, and wherein the current state and present state are the current health and present health respectively, such that the computer program product further comprises instruction means to cause a computer to perform operations of:

receive a signal from a component, the signal being representative of a current health observation of the component;

compute a present health of the component based on the signal; and compute a likelihood of a future health of the component for a given future mission, whereby through diagnosis, a user can determine the present health of the component, and based on the present health and future mission, determine the future likelihood of failure of the component.

24. A computer program product for diagnosis and prognosis as set forth in claim 23, further comprising instruction means for causing a computer to perform operations of:

computing present prior probabilities of component failure;

computing present posterior probabilities of component failure given present health observations;

computing prior probabilities of component failure at an end of the future mission; and computing future posterior probability of component failure at the end of future the mission, where the future posterior probability indicates the likelihood of failure for the component at the end of the future mission.

25. A computer program product as set forth in claim 24, further comprising instruction means for causing a computer to perform operations of:

generating a failure histogram of component failures as a function of a component's usage variables, where each component has usage variables that are indicative of usage of the component, and the histogram having a past bin, a present bin, and a future bin;

using the histogram, determining the prior probability of component failure for each component;

identifying a present value of the usage variable from the failure histogram, the present value being the present bin; and updating the failure histogram for each component to reflect that the component did not fail until the present bin, with the probability of the present bin in the updated failure histogram being the present prior probability of component failure.

26. A computer program product as set forth in claim 25, further comprising instruction means for causing a computer to perform operations of:

setting the values of probabilities for the past bins to zero; and normalizing the probabilities for the present and future bins so that their sum is equal to one, with the probability for the present bin being the present prior probability of component failure.

27. A computer program product as set forth in claim 26, wherein when causing a computer to update the failure histogram, if a histogram is unknown for a component, further comprising instruction means for causing a computer to perform an operation of setting the prior probabilities for that component to a failure rate across the components.

28. A computer program product as set forth in claim 27, further comprising instruction means for causing a computer to perform operations of:

setting the prior probabilities of the components to probability values computed in claim 26;

determining the failure state of present-health observations by applying an observation algorithm to an observation selected from a group consisting of sensor outputs, manual measurements, and component symptoms; and computing posterior probability of failure of the components given prior probabilities and observations, where the posterior probability of failure indicates which components have likely already failed.

29. A computer program product as set forth in claim 28, further comprising instruction means for causing a computer to compute the posterior probability of failure using a Bayesian Network inference algorithm.

30. A computer program product as set forth in claim 29, further comprising instruction means for causing a computer to perform operations of:

renormalizing the failure histograms for each component by replacing the prior probability of failure for the present bin with the posterior probability of failure and updating the probability values for the future bins so that a sum of the probabilities for the present bin and future bins remains equal to a predetermined value, thereby creating a discrete density function;

computing a distribution function from the discrete density function, with each bin of the distribution function being a sum of preceding bins in the renormalized failure histogram; and determining a bin that corresponds to an end of the future mission, where the value in the bin that corresponds to the end of the future mission is the prior probability of component failure at the end of the future mission.

31. A computer program product as set forth in claim 30, further comprising instruction means for causing a computer to perform operations of:

setting the prior probabilities of the components to values computed in claim 30;

setting health-trend observations as values obtained from a trending algorithm; and computing the future posterior probabilities of component failure using a Bayesian Network inference algorithm, where the future posterior probability indicates the likelihood of failure for a particular component at the end of the future mission.

* * * * *